May 3, 1932.  C. W. RICE  1,856,786

BUCKET WHEEL AND LIKE ROTATING MEMBER

Filed Oct. 16, 1931

Inventor:
Chester W. Rice,
by Charles A. Mullan
His Attorney.

Patented May 3, 1932

1,856,786

UNITED STATES PATENT OFFICE

CHESTER W. RICE, OF SCHENECTADY, NEW YORK, ASSIGNOR TO GENERAL ELECTRIC COMPANY, A CORPORATION OF NEW YORK

BUCKET WHEEL AND LIKE ROTATING MEMBER

Application filed October 16, 1931. Serial No. 569,286.

The present invention relates to bucket wheels and like rotating members which during their operation are subjected to vibrations. The vibrations may be caused by external means or may be inherent in the structure. For example, in the case of bucket wheels such as are used in elastic fluid turbines the vibrations may be effected owing to unequal distribution of load on the wheels or static or dynamic unbalances of the wheels. The vibrations gradually cause fatigue of the wheel, particularly of the blades. In many cases the rotary member cooperates with a more sensitive apparatus whereby the vibrations of the member may be transferred to such apparatus and undesirably affect its operation.

The object of my invention is an improved construction for bucket wheels and like rotating members, whereby the oscillatory energy of the vibrations is substantially absorbed or abstracted.

For a consideration of what I believe to be novel and my invention, attention is directed to the following description and the claims appended thereto, and to the accompanying drawings which form a part of this specification.

Figure 1:
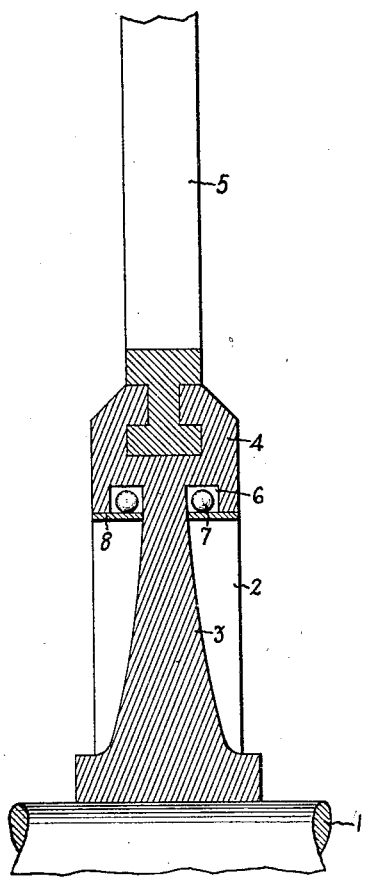
Figure 2:
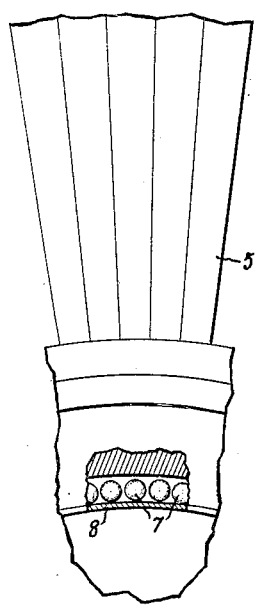
Figure 3:
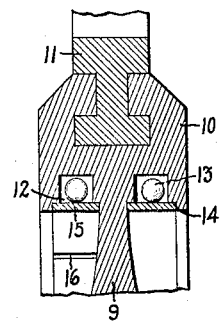

In the drawings, Fig. 1 illustrates by way of example a section of an elastic fluid turbine bucket wheel, partly diagrammatic and partly broken away; Fig. 2 is a fragmentary front view of Fig. 1, partly broken away; Fig. 3 shows a modification embodying my invention.

Referring to Fig. 1, where I have shown a turbine bucket wheel, 1 designates a rotary shaft to which is fastened by any suitable means, not shown, a bucket wheel 2 comprising a web 3, a rim 4 integrally formed with the web and a ring or row of blades or buckets 5 fastened to the rim of any suitable means, in the present instance shown as a dovetail connection.

According to my invention, I provide annular grooves or recesses 6, preferably of rectangular cross section in the rim 4 of the wheel or rotating member. The groove or grooves are concentrically arranged about the axis of rotation as a center. Arranged in these grooves or recesses are a plurality of freely movable means in the present instance indicated as balls 7. In order to retain these balls in the recesses, I may provide a ring or rings 8, covering the grooves or recesses and being secured to the rim by soldering, welding, brazing, or like method. Grooves 6 and rings 8 form in substance circumferentially extending passages of rectangular cross section.

During the operation, vibration of the wheel may occur whereby waves travel along the periphery of the rim and cause sidewise movement of the parts thereof. These movements cause similar motions of the balls whereby they roll on the surface of the grooves in sidewise direction and cause impact on the walls forming the grooves to the effect that the oscillatory energy is substantially absorbed. In the drawings the balls 7 are shown as lying on the rings 8. During rotating of the wheel they fly outwardly due to the centrifugal force exerted thereon, and thus engage the surface of the grooves. It is understood that the balls may also move in circumferential direction to absorb oscillatory energy. Grooves of rectangular cross section are preferable owing to the fact that they allow axial movement of the balls without causing a change with respect to the centrifugal force to which such balls are subjected. It will be readily seen that in rounded grooves the balls are normally retained in a central position. An axial movement of the balls, due to axial vibration of the rotating member, necessitates a radial inward movement of the balls, that is, a partial compensation of the centrifugal force inherent in the balls in their central position. As the compensation of the centrifugal force has to be overcome by the force causing the axial movement, the sidewise impact on the walls forming the groove will be less than in substantially rectangular grooves where the balls are free to move sidewise. In other words, with rectangular grooves the centrifugal force does not impose a restoring force on the balls.

In Fig. 3 where I have shown a modification embodying my invention, 9 is the web, 10 designates the rim, and 11 a bucket or blade fastened to the rim, 12 are annular recesses or grooves in which a plurality of balls 13 are provided in a similar manner as in Fig. 1. Whereas I have shown in Fig. 1 a closing member for the grooves in the form of a ring mechanically fastened to the rim, I provide according to the modification shown in Fig. 3 the recesses with shoulders 14 forming a seat for split rings 15 held on said seats by frictional resistance without being mechanically fastened thereto, as disclosed by the Patent No. 1,813,820 to A. A. Ross. The break of the spring ring, shown on the left side of the web, is indicated at 16. These rings have a natural frequency of vibration which is different from that of the web, thereby forming an additional means for absorbing oscillatory energy from the wheel by friction. Whereas the balls are more adapted to absorb oscillatory energy of comparatively low frequency, the split rings are adapted to absorb oscillatory energy of higher frequency, more particularly of audible frequency.

With my invention I have accomplished a simple, reliable and comparatively cheap construction for dampening vibrations of rotating members, which with respect to bucket wheels does not affect the flow of fluid through the turbine.

What I claim as new and desire to secure by Letters Patent of the United States, is:

1. A rotating member having a groove extending about the axis of rotation as a center, and means in the groove for causing impact against the walls forming the groove, said means being freely movable in axial direction of the member whereby vibratory energy of the member may be abstracted.

2. A rotating member having a passage of rectangular cross section extending about the axis of rotation as a center and means therein for causing impact against the walls forming the passage, said means being freely movable in axial and circumferential direction of the member whereby vibratory energy of the member may be abstracted.

3. A rotating member having an annular groove of rectangular cross section, freely movable balls in the groove, and a ring covering the groove and fastened to the rotating member.

4. A rotating member having a groove of rectangular cross section, said groove having a shoulder, freely movable balls in the groove, and a spring ring seated on the shoulder and held in contact with the walls of the rotating member by frictional resistance whereby the balls and the spring ring may absorb vibratory energy from the wheel.

5. In a bucket wheel comprising a web, a rim having an annular recess provided with a shoulder and buckets fastened to the rim, freely movable balls in the recess and a split ring having a period of vibration different from the natural period of vibration of the rim and seated on the shoulder of the recess without being mechanically fastened thereto, whereby the balls and the ring may absorb oscillatory energy of the wheel due to friction and impact with the rim.

In witness whereof I have hereunto set my hand.

CHESTER W. RICE.